United States Patent
Beson et al.

(10) Patent No.: US 6,397,589 B1
(45) Date of Patent: Jun. 4, 2002

(54) EXHAUST PIPES AND ASSEMBLIES

(75) Inventors: Thomas William Beson; Joseph Raymond Zelinski, both of Menasha, WI (US)

(73) Assignee: Custom Marine, Inc., Menasha, WI (US)

( * ) Notice: Subject to any disclaimer, the term of this patent is extended or adjusted under 35 U.S.C. 154(b) by 0 days.

(21) Appl. No.: 09/652,195

(22) Filed: Aug. 31, 2000

Related U.S. Application Data

(60) Provisional application No. 60/151,562, filed on Aug. 31, 1999.

(51) Int. Cl.$^7$ ................................................. F01N 3/02
(52) U.S. Cl. ............................... 60/320; 60/323; 60/321
(58) Field of Search ........................... 60/298, 320, 321, 60/323, 282, 322

(56) References Cited

U.S. PATENT DOCUMENTS

| | | | |
|---|---|---|---|
| 2,935,039 A | | 5/1960 | Thompson |
| 3,206,836 A | | 9/1965 | Schlussler |
| 3,324,533 A | | 6/1967 | Watteau |
| 3,509,917 A | | 5/1970 | Gartner |
| 3,908,372 A | | 9/1975 | Fowler et al. |
| 3,934,618 A | | 1/1976 | Henderson |
| 3,938,233 A | | 2/1976 | Cannon |
| 4,179,884 A | * | 12/1979 | Koeslin ................. 60/321 |
| 4,644,780 A | | 2/1987 | Jeter |
| 4,679,622 A | | 7/1987 | Cannon |
| 4,977,741 A | | 12/1990 | Lulloff et al. |
| 5,148,675 A | * | 9/1992 | Inman .................. 60/321 |
| 5,167,934 A | * | 12/1992 | Wolf et al. ............ 422/177 |
| 5,562,509 A | * | 10/1996 | Nakase et al. ........ 440/89 |
| 5,820,426 A | | 10/1998 | Hale |
| 5,829,249 A | * | 11/1998 | VanRens ............... 60/298 |
| 5,873,330 A | * | 2/1999 | Takahashi et al. .... 123/41.31 |
| 5,899,063 A | * | 5/1999 | Liestritz ............... 60/298 |

FOREIGN PATENT DOCUMENTS

| | | | |
|---|---|---|---|
| JP | 63 215809 | 9/1988 | ............. F01N/7/10 |
| JP | 07 247838 | 9/1995 | ............. F01P/3/12 |

* cited by examiner

Primary Examiner—Thomas Denion
Assistant Examiner—Binh Tran
(74) Attorney, Agent, or Firm—Wilhelm Law Service; Thomas D. Wilhelm

(57) ABSTRACT

Manifold pipe assemblies and exhaust manifold assemblies, optionally in combination with internal combustion engines, for receiving hot gases from such heat source, and conveying such hot gases from the heat source toward a lower temperature environment. Such manifold pipe assembly comprises a manifold pipe defining a gas path for conveying hot gases from an inlet end to an outlet end, a jacket pipe encompassing the manifold pipe along a portion of the length of the manifold pipe. The jacket pipe has a second inlet end disposed toward the inlet end of the manifold pipe, and a second outlet end disposed toward the outlet end of the manifold pipe. The jacket pipe is closed about the manifold pipe at the second inlet end, to form a closed cooling chamber between the manifold pipe and the jacket pipe. An inlet pipe conveys cooling liquid into the cooling chamber. A closed end chamber portion of the cooling chamber is defined optionally between the inlet pipe and a face of the cooling chamber disposed toward the manifold end of the manifold pipe, sufficiently close to the inlet end of the cooling chamber in combination with the closed end chamber portion being suitably configured, as to maintain sufficient flow of cooling liquid at the inlet end, into and through the closed end chamber portion, to preclude development of localized hot spots on the manifold pipe adjacent the cooling chamber when cooling water is routinely passing through the cooling chamber during routine operating conditions of the pipe assembly. Some embodiments preferably include an enlarged section of the cooling chamber proximate or at the inlet end of the cooling chamber, which acts as an accumulation reservoir for increasing residence time of the cooling liquid therein, thereby to absorb additional heat from the manifold pipe adjacent the inlet end of the cooling chamber.

74 Claims, 7 Drawing Sheets

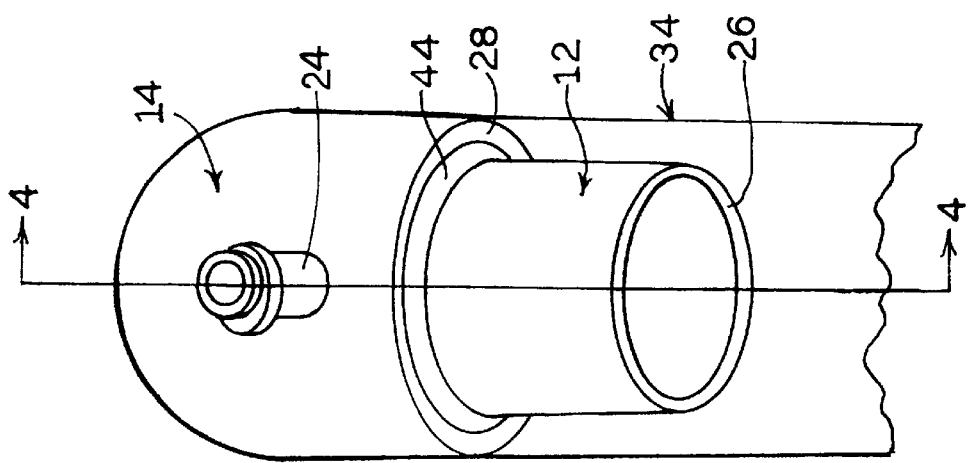
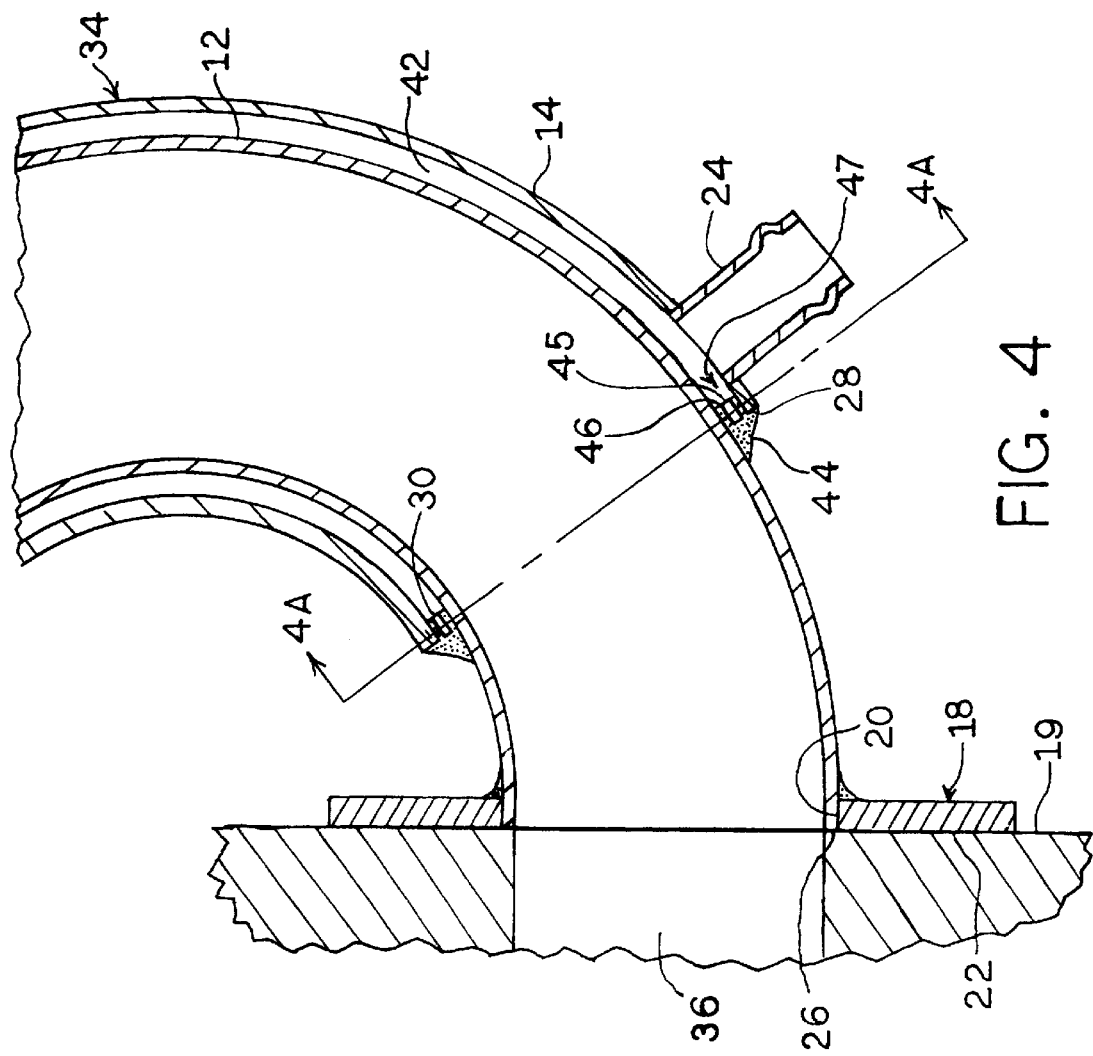

EXHAUST PIPES AND ASSEMBLIES

CROSS-REFERENCE TO RELATED APPLICATIONS

This application claims priority to Provisional Application Serial No. 60/151,562 filed Aug. 31, 1999.

BACKGROUND

Internal combustion engines, both reciprocating and rotary engines, burn fuel to generate power. The combustion process produces an ongoing stream of hot combustion gases. The chemical composition of the stream of hot combustion gases is toxic to human ingestion. Under some conditions, the chemical composition of the hot combustion gases coming from an internal combustion engine is further combustible, and potentially explosive. The heat in the hot combustion gases must be removed from the engine on an ongoing basis in order to maintain a suitable operating environment in which the engine can operate.

To the extent the engine is mounted in an open air environment outside any enclosing structure, the exhaust gases can be vented into the open surroundings around the engine optionally through a scrubbing device and/or a sound attenuation device. However, in many applications, internal combustion engines are housed in relatively closed spaces, such as in engine compartments of land-based motor vehicles, in engine compartments of smaller watercraft, or in effectively totally enclosed quarters of e.g. ocean-going ships. Venting exhaust gases into the environment immediately surrounding the engine in such enclosing environments is unacceptable considering toxicity of such gases, considering combustibility of such gases, and considering heat content of such gases.

Accordingly, it is common practice to mount a ducted exhaust system to such engines, to duct the gases and heat away from the engine, to a safe location where the gases and heat can prudently be vented to the ambient open-air environment. Such ducted exhaust system can be as simple as a tubular pipe connected to an exhaust passage on the engine, leading to a safe venting location. In the alternative, the exhaust system can be quite elaborate in terms both of ducting of the gases and/or passing the gases through additional processes such as through a catalytic converter and/or through a muffler, before finally venting the resultant gases to the open air. Typically, the more sensitive the environment within which the engine is operating, or the more powerful the engine, the more elaborate and/or more sophisticated the exhaust system.

This invention relates to exhaust systems designed for high performance internal combustion engines, recognizing that the concepts utilized in the invention apply as well to exhausting hot gases generated by other sources. Accordingly, it is contemplated that the teachings here, and the claims which follow, will be construed as applying to such other heat sources to the extent the apparatus and methods disclosed here apply to such heat sources.

More specifically, this invention relates to exhaust systems, and especially to manifold pipe assemblies, and manifold pipe clusters in such exhaust manifold assemblies and exhaust systems. Such pipe assemblies, pipe clusters, manifold assemblies, and exhaust systems are used for collecting and disposing of heat and hot gases received from a source of heat and hot gases. Such heat and hot gases are commonly generated in large quantities by high performance internal combustion engines, for example engines capable of developing 350 or more horsepower, such as 1000 horsepower, 1500 horsepower, 2500 horsepower and more with which exhaust apparatus of the invention is suitably used.

Tubular metal manifold pipes are commonly mounted to exhaust passages on the engine to convey heat and exhaust gases away from the engine, and away from the engine compartment or other actual or functional enclosure in which the engine is disposed. Such manifold pipes receive the gases and heat expelled from the engine during exhaust cycles of the respective combustion chambers. Combustion gases and unburned fuel, along with the associated heat, are expelled from the engine through one or more exhaust passages. When a particular combustion chamber is in the exhaust stage of chamber operation, the piston or rotary vane, or other containment structure containing the combustion, forces the exhaust gases out of the combustion chamber through one or more such exhaust ports. Opening and closing of the exhaust ports may be regulated by, for example, exhaust valves in a four cycle engine. During an exhaust cycle of such four-cycle engine, the exhaust valves are lifted to open the exhaust ports through which the gases can escape. When a given exhaust cycle is finished, respective exhaust valves are returned to their closed positions.

Many engines contain or comprise multiple combustion chambers, namely cylinders, which may be aligned in one or more rows or other arrangements, each combustion chamber having its own exhaust requirements and corresponding exhaust apparatus for receiving, conveying, and treating exhaust gases. In high performance engines, individual exhaust manifold pipes are typically assigned to respective individual combustion chambers. Typically, the multiple manifold pipes, associated with multiple respective combustion chambers, are secured to each other at ends of the manifold pipes disposed away from the engine exhaust passages. The ends of the multiple manifold pipes are mounted to a manifold mounting bracket at the engine. The manifold mounting bracket has receiving apertures suitably sized, configured, and positioned to receive the respective manifold pipes in suitable orientation for alignment of the bracket receiving apertures and the manifold pipes with corresponding exhaust passages of the engine. Open pipe ends are, for example, inserted into the apertures in the manifold mounting bracket and are secured to the bracket such as by welding closed those portions of the apertures disposed outwardly of the manifold pipes.

The manifold mounting bracket is mounted securely to the engine by e.g. mounting bolts which extend through corresponding mounting holes in the mounting bracket, and which are turned into threaded holes in the engine. Such mounting brings the manifold bracket receiving apertures and the open ends of the manifold pipes into alignment with respective exhaust passages of the engine. Such alignment creates sealed continuous paths for flow of exhaust gases from the combustion chambers, through the exhaust passages of the engine, through the receiving apertures of the manifold bracket, and through the manifold pipes of the exhaust system, and thus away from the engine.

The engine exhaust passages are typically short, cylindrical apertures leading from respective combustion chambers, through respective exhaust ports, toward outside ambient environment.

The manifold bracket thus serves as an interface, mating the intake ends of the manifold pipes with the exhaust passages of the engine. The plurality of manifold pipes thus connected to the engine are sometimes referred to as a manifold pipe cluster.

In a multiple-cylinder engine, distal outlet ends of multiple ones of the manifold pipes may be received in common into an intake end of an exhaust pipe, which collects exhaust gases from two or more of the manifold pipes, and further conveys the exhaust gases and heat away from the engine. When so combined with an exhaust pipe downstream of the manifold pipe cluster, the combination assembly is generally referred to as an exhaust manifold assembly. Typically, a given multiple cylinder engine may have as few as one exhaust pipe, up to as many exhaust pipes as the engine has cylinders. The exhaust manifold assembly, in combination with any other components used therewith, such as catalytic converter, muffler, tail pipe, etc., defines the exhaust system.

Exhaust gas temperatures at the manifold mounting bracket can be greater than 1000 degrees Fahrenheit. High temperature of the exhaust gases is desirable for high power output from the engine, but places a high degree of stress on the manifold pipes. Namely, excessively high temperatures at especially the intake ends of the manifold pipes can lead to premature failure of conventional exhaust manifold assemblies, compromising the ability of the exhaust manifold assembly to remove the heat and exhaust gases from the engine and engine compartment. Such failure commonly comprises a hole in one or more of the manifold pipes, or in a joint between a manifold pipe and another element of the exhaust system. Exhaust gases can then escape from the exhaust manifold assembly through such holes.

As engine designers develop ever more powerful engines, exhaust gas temperatures at the engine exhaust passages tend to increase in association with the increase in power. Accordingly, while suitable designs are known for tolerating gas toxicity and combustibility in the exhaust systems of lower power engines, designers of exhaust systems are faced with an ongoing process of developing exhaust systems, and especially the manifold clusters which must tolerate increasingly higher temperatures coming out of the exhaust passages, operative to receive such higher temperature exhaust gases at the engine exhaust passages.

One known method of handling the thermal stresses imposed by the hot exhaust gases is to fabricate the manifold pipes with materials which resist failure at the operative high exhaust gas temperatures.

However, material selection as a solution to temperature tolerance is limited in that few materials exhibit the set of necessary properties tolerant of the high operating temperatures; and such materials tend to be costly. In addition, material selection does not provide mechanisms for rapid dissemination and dissipation of the heat from the manifold cluster sufficient to provide suitable use life for the manifold cluster.

While material selection plays a significant role in designing manifold pipes, material selection alone does not provide a cost effective solution to rapid heat dissipation in existing high performance environments. Indeed, known conventional cost-effective materials are susceptible to failure at the high temperatures associated with current high performance engine conditions when transfer of heat out of the exhaust system depends entirely on flow of the hot gases through the exhaust system pipes in combination with conductive and convective transfer of heat from outer surfaces of the pipes to a gaseous surrounding environment.

Conventionally-used exhaust pipe materials are based, separately, on steel and tungsten. However, as engine design progresses, developing higher power output, greater volumes of exhaust gases are developed, at temperatures that may well be higher than currently known or projected temperatures, at the inlet ends of the manifold pipes. Thus, relying on increasingly more sophisticated materials to handle the hot exhaust gases is not a preferred solution. Further, high performance materials such as tungsten can undesirably drive up the cost of the exhaust system.

Rather, it would be desirable to provide alternate exhaust technology for handling exhaust gas heat wherein the alternate technology has the potential for further cost effective development to accommodate increases in volume and/or temperature of exhaust gases as new, more powerful, internal combustion engines are developed.

To effect higher rates of heat transfer from the manifold pipes, it is known to surround a manifold pipe with a second, outwardly disposed cooling jacket pipe and to pass a respective cooling liquid such as water through the jacket chamber between the cooling jacket pipe and the manifold pipe.

Jacketed pipe cooling, with liquid between the manifold pipe and an outwardly disposed cooling jacket pipe is known in especially marine engine applications. The use of jacketed cooling is a step forward in exhaust technology in that the rate of heat transfer to liquid e.g. water is potentially greater than the potential for removing heat using gaseous air surrounding the hot manifold pipes as the heat receiver, because of the higher specific heat of water. Superiority of liquid e.g. water as a cooling medium, as opposed to air, is well known. By adopting water jacket cooling, one can potentially provide a much wider range of cooling capacities than with air-medium cooling, by controlling the incoming water temperature and volume of water flowing through the jacket, as well as other jacket parameters.

However, even with conventional liquid-cooled jacketing, users experience only limited service life from currently available exhaust manifold assemblies at high engine performance conditions, after which one or more of the jacketed manifold pipes fails, or a joint fails, leaking exhaust gases or water ahead of the outlet end of the exhaust pipe. The invention herein provides exhaust systems, and especially manifold pipe assemblies and exhaust manifold assemblies, having significantly greater use lives in such use environments than conventional water-jacketed exhaust systems.

It is known that satisfactory operation of a jacketed cooling exhaust system requires an ongoing flow of cooling liquid (e.g. water) through the cooling jacket chamber. The function of the flowing water is to collect heat from the manifold pipes and to transport the heat away from the pipes, thus reducing the effective operating temperatures of the manifold pipes; and correspondingly reducing mechanical stresses that accompany high temperature operations. But, as indicated above, conventional water jacketed exhaust manifolds do not fulfill the anticipated potential for use life of water jacketed manifold pipes in high performance environments.

The inventors herein have discovered improved designs for liquid jacketed manifold pipe assemblies and for exhaust manifold assemblies. While choosing to not be bound by theory, the inventors believe that failure of conventional water jacket designs is associated with inadequate distribution of water flow inside the cooling jacket chamber. The inventors further believe that the inadequate distribution of liquid flow leads to vaporization of the cooling water in certain areas or zones of the jacketed, water-carrying chamber. Such vaporization of cooling water in the cooling jacket chamber creates water vapor.

The cooling capacity of water vapor is far less than the cooling capacity of liquid water. In addition, water vapor can become trapped in the cooling jacket chamber whereby the inability of the vapor to flow through the chamber with the liquid water and exit the water jacket cooling chamber is attended by a corresponding inability to remove the desired amounts of heat from the affected portion of the water jacket cooling chamber, as well as inability to maintain ongoing flow of cooling water through that portion of the jacketed chamber.

In such instances, the overall temperatures of the manifold pipes rise, and/or hot spots may develop in the pipes, wherever there is vapor or where the vapor is trapped. As the pipes heat up in the hot spots, the metals at those spots expand more than at desirably cooled portions of the pipes, exerting excessive mechanical stresses on the jacketed pipe assembly at such hot spots, resulting in premature pipe failure. For example, repeated expansion and contraction of the pipe and jacket combination under e.g. internal gaseous pressure created by vaporization of the liquid in the cooling jacket can quickly fatigue the metal at the stressed locus, causing a rupture of the metal such as at a joint between sections of the inner manifold pipe.

To contain the cooling fluid within the jacket, the outer jacket pipe must be sealed about the inner manifold pipe at a leading edge of the cooling chamber proximate the engine exhaust passage, between the manifold pipe and the jacket pipe, thus to fabricate the closed jacketed cooling chamber. Under use conditions, the jacket pipe is generally significantly cooler than the manifold pipe. Thus, the jacket pipe material expands less than the inner, hotter manifold pipe. As the inner manifold pipe becomes hotter than the jacket pipe, the manifold pipe expands more than the jacket pipe, placing mechanical stress on the joint, namely the seal between the manifold pipe and the jacket pipe proximate the manifold bracket. Where sufficient temperature gradients exist, such mechanical stress may be sufficiently great to induce premature failure at e.g. such fabricated mechanical joint.

SUMMARY OF THE DISCLOSURE

In a first family of embodiments, the invention comprehends a manifold pipe assembly for receiving hot gases from a heat source, and conveying such hot gases from the heat source toward a lower temperature environment. The manifold pipe assembly comprises a manifold pipe having a first inlet end and a first outlet end, and a length between the first inlet end and the first outlet end, the manifold pipe defining a gas path for conveying hot gases from the first inlet end to the first outlet end; a jacket pipe disposed outwardly of, and encompassing, the manifold pipe along a portion of the length of the manifold pipe. The jacket pipe has a second inlet end disposed toward the first inlet end of the manifold pipe, and a second outlet end disposed toward the first outlet end of the manifold pipe. The jacket pipe is closed about and secured to the manifold pipe at the second inlet end of the jacket pipe, thereby to form a cooling chamber between the manifold pipe and the jacket pipe, the cooling chamber having a closed inlet end. The manifold pipe assembly further comprises an inlet pipe providing liquid communication into the cooling chamber. A closed end chamber portion of the cooling chamber is defined between the inlet pipe and a face of the cooling chamber disposed toward the first end of the manifold pipe. The inlet pipe is sufficiently close to the inlet end of the cooling chamber in combination with the closed end chamber portion being suitably configured as to maintain sufficient flow of cooling liquid at the inlet end, into and through the closed end chamber portion, to preclude development of localized hot spots on the manifold pipe adjacent the cooling chamber when cooling water is routinely passing through the cooling chamber during routine operating conditions of the pipe assembly.

In some embodiments, the jacket pipe has an inside diameter at least 0.12 inch, preferably at least 0.25 inch, greater than the outside diameter of the manifold pipe.

Preferably, the cooling chamber has a depth measured between an outer diameter of the manifold pipe and an inner diameter of the jacket pipe, and a ratio of the depth of the cooling chamber to the outside diameter of the manifold pipe, at locations away from the inlet end of the cooling chamber, of about 0.05/1 to about 0.3/1, more preferably about 0.1/1 to about 0.25/1.

In preferred embodiments, the second inlet end of the jacket pipe is spaced e.g. displaced a substantial distance, for example about 0.5 inch to about 3 inches, preferably about 0.75 inch to about 2 inches, from the first inlet end of the manifold pipe at the locus of closest approach.

In some embodiments, the manifold pipe assembly includes, as a relatively enlarged cross-section portion of the jacket pipe, an accumulation reservoir as part of the cooling chamber proximate the second inlet end of the jacket pipe, the accumulation reservoir being effective to increase residence time of cooling liquid in the cooling chamber at the accumulation reservoir.

Preferably the distance between the inlet pipe and the face of the closed end chamber portion is no more than about 0.5 inch, and is preferably about 0.12 inch to about 0.38 inch, optionally about 0.19 inch.

In preferred embodiments, in routine hot gas transfer operation, the manifold pipe exhibits temperature-related color differentiation indications at an outer surface thereof between the first end of the manifold pipe and the second inlet end of the jacket pipe.

Typical exhaust elements of the invention, such as the manifold pipe assemblies, exhaust systems, and the like are well suited for use in combination with internal combustion engines designed and configured to develop significant power levels, such as at least 350 horsepower, for example 1000 horsepower, 1500 horsepower, 2500 horsepower, and more.

Preferred embodiments of the manifold pipe assembly include an accumulation reservoir having a second depth at least 1.2 times as great as the first depth. The accumulation reservoir provides for increased residence time of the cooling liquid adjacent the inlet end of the cooling chamber, compared to the relative residence time of the cooling liquid at respective portions, of equal longitudinal dimensions, along the length of the cooling chamber and away from the accumulation reservoir, thus to provide enhanced cooling capacity precisely at the most useful location along the length of the manifold pipe.

In some embodiments, the jacket pipe, and thus the cooling cavity, including the accumulation reservoir, are disposed toward but spaced from the first inlet end of the manifold pipe.

In preferred embodiments, the ratio of the length of the accumulation reservoir to the outside diameter of the manifold pipe is about 0.3/1 to about 2/1, preferably about 0.6/1 to about 1.5/1.

The accumulation reservoir preferably has ratio of length to maximum depth of about 0.5/1 to about 15/1, preferably about 4/1 to about 10/1.

In some embodiments, the inlet end of the jacket pipe is joined to an outer surface of the manifold pipe at a joint having an approach angle of about 70 degrees to about 110 degrees, preferably about 80 degrees to about 100 degrees, and extends away from the outer surface of the manifold pipe along an arcuate path, thereby enabling the jacket pipe to flex according to thermal stresses placed on the jacket pipe while retaining acceptable levels of stress at the joint.

In preferred embodiments employing the accumulation reservoir, the inlet pipe is sufficiently close to the inlet end of the cooling chamber, optionally in combination with the closed end of the chamber being suitably configured, as to maintain sufficient flow of cooling liquid at the inlet end, into and through the closed end chamber portion, to preclude substantial vaporization of cooling water at the closed end chamber portion under routine operating conditions of the pipe assembly.

Also in preferred embodiments employing the accumulation reservoir, the inlet pipe is sufficiently close to the inlet end of the cooling chamber in combination with the closed end chamber portion being suitably configured as to maintain sufficient flow of cooling liquid at the inlet end, into and through the closed end chamber portion, to preclude development of localized hot spots on the manifold pipe adjacent the cooling chamber when cooling water is routinely passing through the cooling chamber during routine operating conditions of the pipe assembly.

The invention further comprehends an exhaust manifold assembly for receiving hot gases from a heat source and for conveying such hot gases from the heat source toward a lower temperature environment. The exhaust manifold assembly comprises a manifold bracket for mounting to the heat source, the manifold bracket having a plurality of apertures extending therethrough; a manifold pipe cluster comprising a plurality of jacketed manifold pipe assemblies, inlet ends of the manifold pipe assemblies being received in gas-tight securement into respective ones of the apertures in the manifold bracket; and an exhaust pipe, receiving outlet ends of the manifold pipe assemblies in gas-tight securement at an inlet end of the exhaust pipe, the exhaust pipe receiving hot gases from the manifold pipe assemblies and directing the hot gases away from the heat source.

Each jacketed manifold pipe assembly comprises a manifold pipe having a first inlet end and a first outlet end, and a length between the first inlet end and the first outlet end, and defining a closed conveyance path, open on the respective ends, for conveying hot gases from the first inlet end to the first outlet end, a jacket pipe disposed outwardly of, and encompassing, the manifold pipe along a portion of the length of the manifold pipe. The jacket pipe has a second inlet end disposed toward the first inlet end of the manifold pipe, and a second outlet end disposed toward the first outlet end of the manifold pipe. The jacket pipe is closed about and secured to the manifold pipe at the second inlet end of the jacket pipe, thereby to form a cooling chamber having a closed inlet end, between the manifold pipe and the jacket pipe. Each jacketed manifold pipe assembly further comprises an inlet pipe providing liquid communication into the cooling chamber, a closed end chamber portion of the cooling chamber being defined between the inlet pipe and a face of the cooling chamber disposed toward the first end of the manifold pipe. The inlet pipe is sufficiently close to the inlet end of the cooling chamber in combination with the closed end chamber portion being suitably configured as to maintain sufficient flow of cooling liquid at the inlet end, into and through the closed end chamber portion, to preclude development of localized hot spots on the manifold pipe adjacent the cooling chamber when cooling water is routinely passing through the cooling chamber during routine operating conditions of the exhaust system.

In some preferred embodiments, the second inlet end of the jacket pipe is joined to an outer surface of the manifold pipe at a joint having an approach angle of about 70 degrees to about 110 degrees, and extending away from the outer surface of the manifold pipe along an arcuate path, thereby enabling the jacket pipe to flex according to thermal stresses placed thereon while retaining acceptable levels of stress to the joint.

BRIEF DESCRIPTION OF THE DRAWINGS

FIG. 3 is an end pictorial view of a first embodiment of manifold pipe assemblies of the invention.

FIG. 4 is a cross-section of the manifold pipe assembly of FIG. 3, taken at 4-4 of FIG. 3 and mounted through a manifold bracket to an engine.

Figure 1:
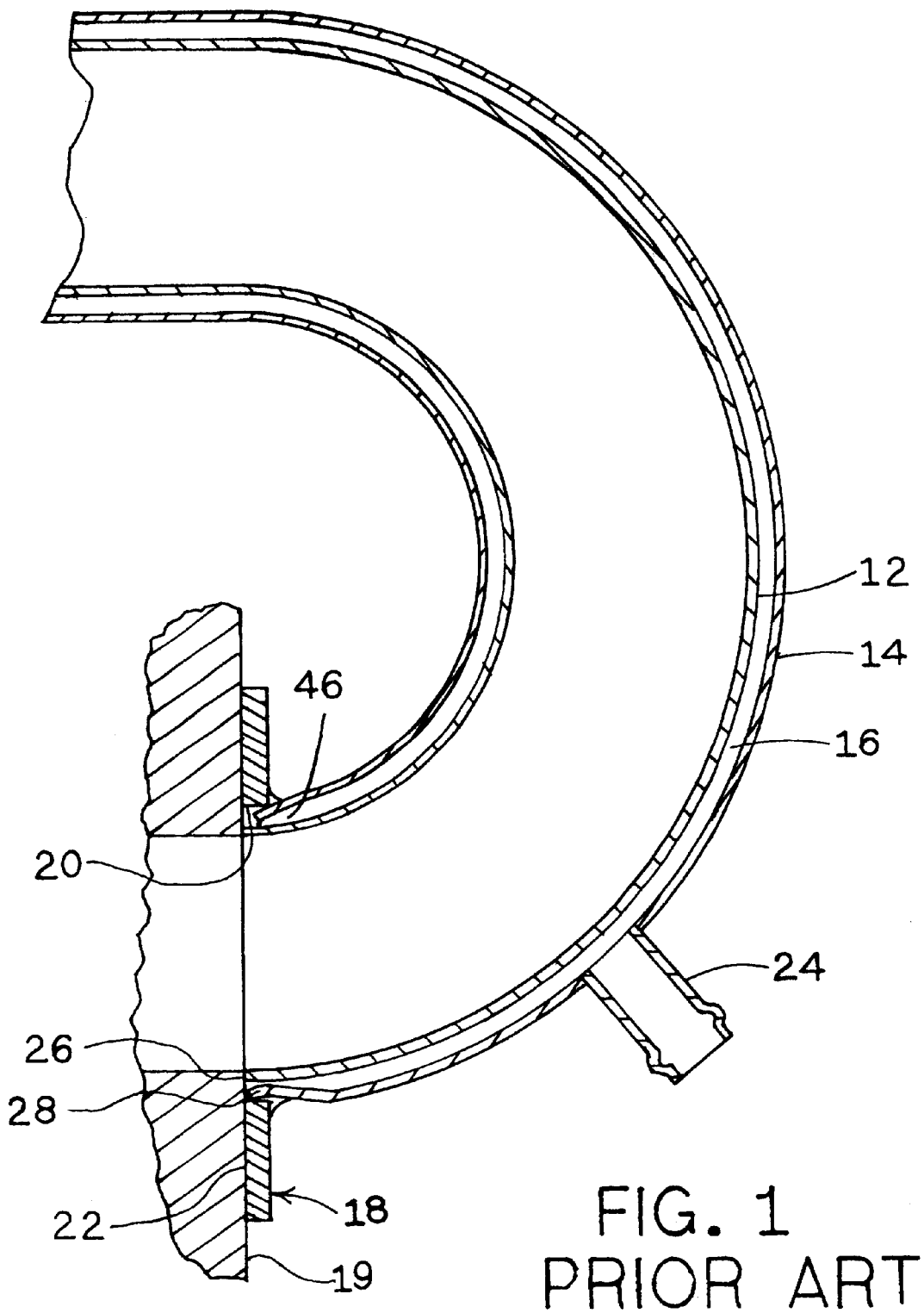
FIGS. 1 and 1A show cross-sections of prior art water jacketed manifold pipe assemblies.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for the purpose of description and illustration and should not be regarded as limiting. Like reference numerals are used to indicate like components.

DETAILED DESCRIPTION OF THE ILLUSTRATED EMBODIMENTS

Figure 1A:
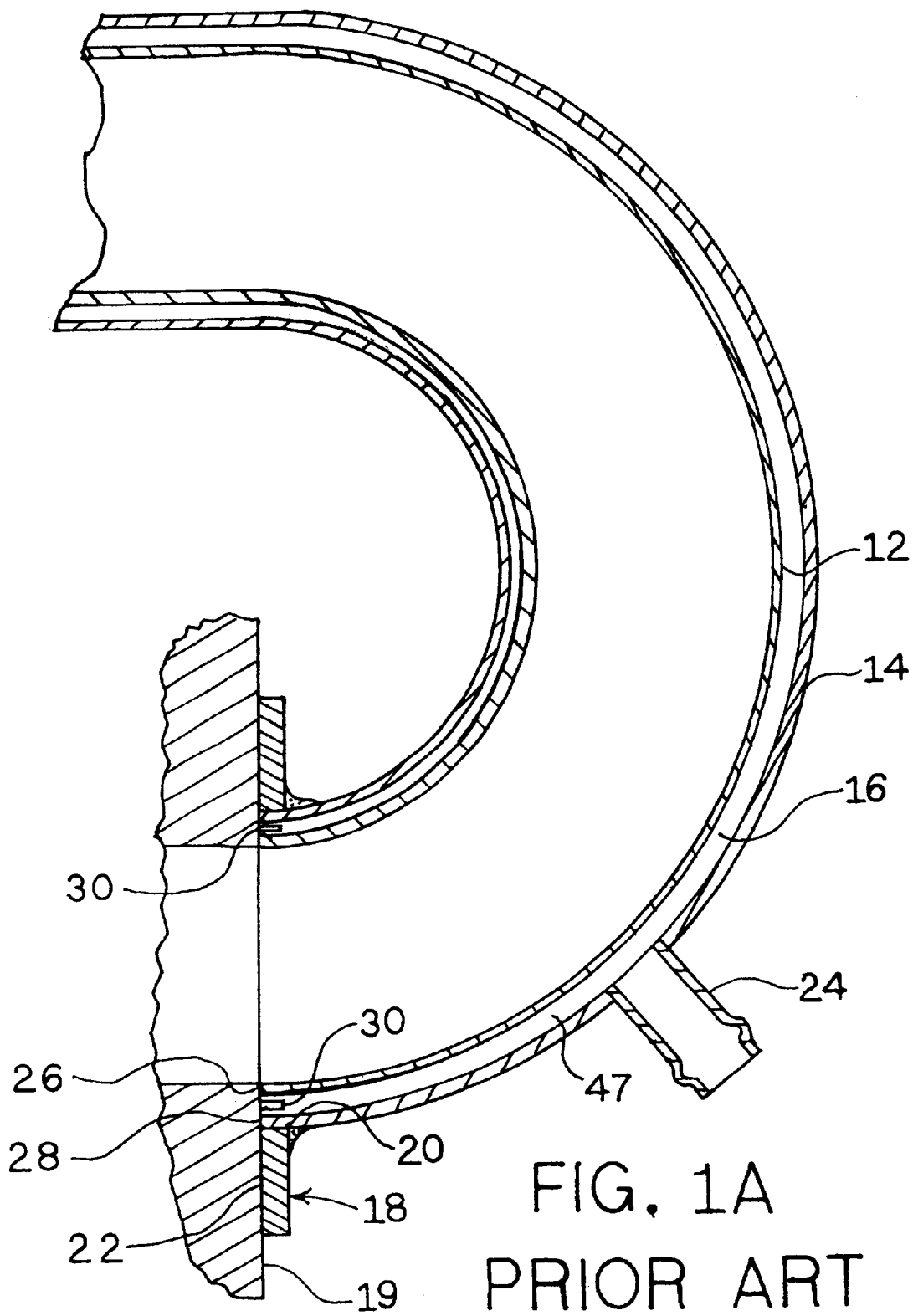

FIGS. 1 and 1A illustrate the manifold bracket end of prior art water jacketed exhaust manifold assemblies. FIG. 1 shows an inner manifold pipe 12, surrounded by a jacket pipe 14, thereby creating a cooling chamber 16 between the manifold pipe and the cooling pipe. The spacing of the jacket pipe from the manifold pipe, thus the size of chamber 16, is typically uniform about the circumference, and along the length, of cooling chamber 16. In FIGS. 1 and 1A, both the manifold pipe and the jacket pipe extend to manifold bracket 18. Manifold bracket 18 is mounted to engine 19 e.g. by mounting bolts, not shown. Distal end 26 of manifold pipe 12 extends through an aperture 20 in manifold bracket 18, to the face 22 of the manifold bracket which interfaces with engine 19. Distal end 28 of outer jacket pipe 14, at bracket 18 and adjacent the engine, is cold formed inwardly against manifold pipe 12, and can extend at least part way into aperture 20. Manifold pipe 12 and jacket pipe 14 are, in combination, welded to each other and to manifold bracket 18 at aperture 20, such that the weld joins the combination of the manifold pipe, the jacket pipe, and the manifold bracket at aperture 20, closing to the interior surface of the manifold bracket that portion of aperture 20 which is disposed outwardly of manifold pipe 12. Further, such welding creates the interior end closure of cooling chamber 16 at manifold bracket 18. Cooling water inlet pipe 24 leads from outside the jacketed pipe assembly into chamber 16 at a locus substantially displaced from manifold bracket 18, and from distal ends 26, 28 of pipes 12 and 14. Inlet pipe 24 carries cooling water into cooling chamber 16. In cooling chamber 16, the cooling water flows along a path generally traversing from inlet pipe 24 away from the engine and toward a more remotely located outlet.

FIG. 1A is similar to FIG. 1 except that jacket pipe 14 is not cold formed inwardly against manifold pipe 12 at the manifold bracket. Rather, distal ends 26, 28 of pipes 12 and 14, which distal ends are to be disposed through a respective aperture 20 and adjacent the engine, are brought into end-to-end alignment with each other, with manifold pipe 12 inside jacket pipe 14. A spacing ring 30, having diameter intermediate the outer diameter of manifold pipe 12 and the inner diameter of jacket pipe 14, is inserted between pipes 12, 14 at the respective distal ends 26, 28.

The combination of the two ends 26, 28 of the pipes, and spacing ring 30, is inserted into aperture 20 in manifold bracket 18. Ends 26, 28, and spacing ring 30 are welded to each other and to manifold bracket 18, thereby closing to the interior surface of the manifold bracket that portion of the manifold bracket aperture which is disposed outwardly of manifold pipe 12, and especially outwardly of jacket pipe 14. In addition, such welding creates the interior end closure and end face of cooling chamber 16 at manifold bracket 18.

While the prior art embodiments of FIGS. 1 and 1A do provide water cooling in cooling chamber 16, exhaust systems fabricated using manifold assemblies as in FIGS. 1 and 1A do not fulfill the expected service life potential contemplated for water cooled exhaust systems.

Figure 2:
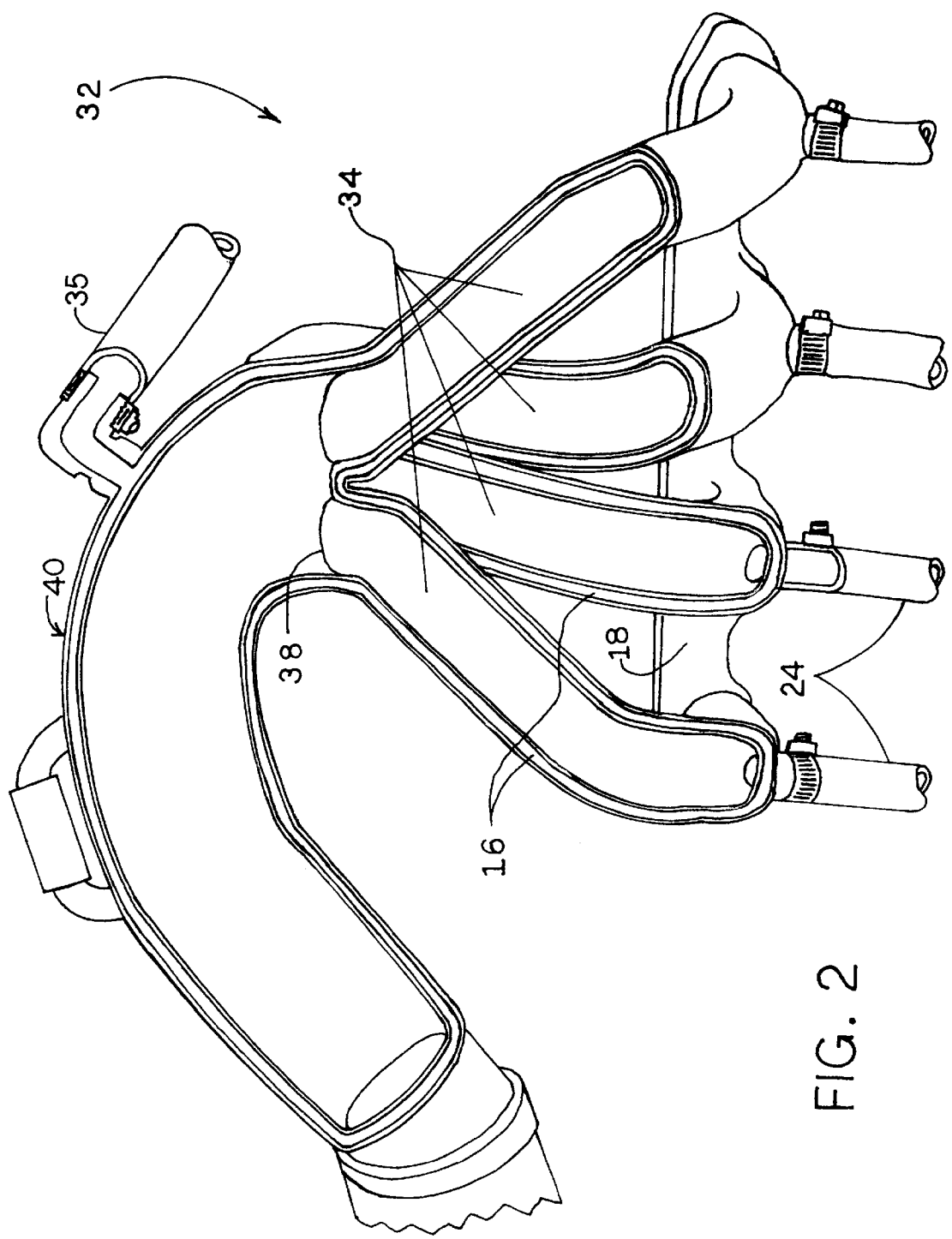
FIG. 2 shows a pictorial view, partially cut away, of an exhaust system made with manifold pipe assemblies of FIGS. 1 and 1A.
Figure 4A:
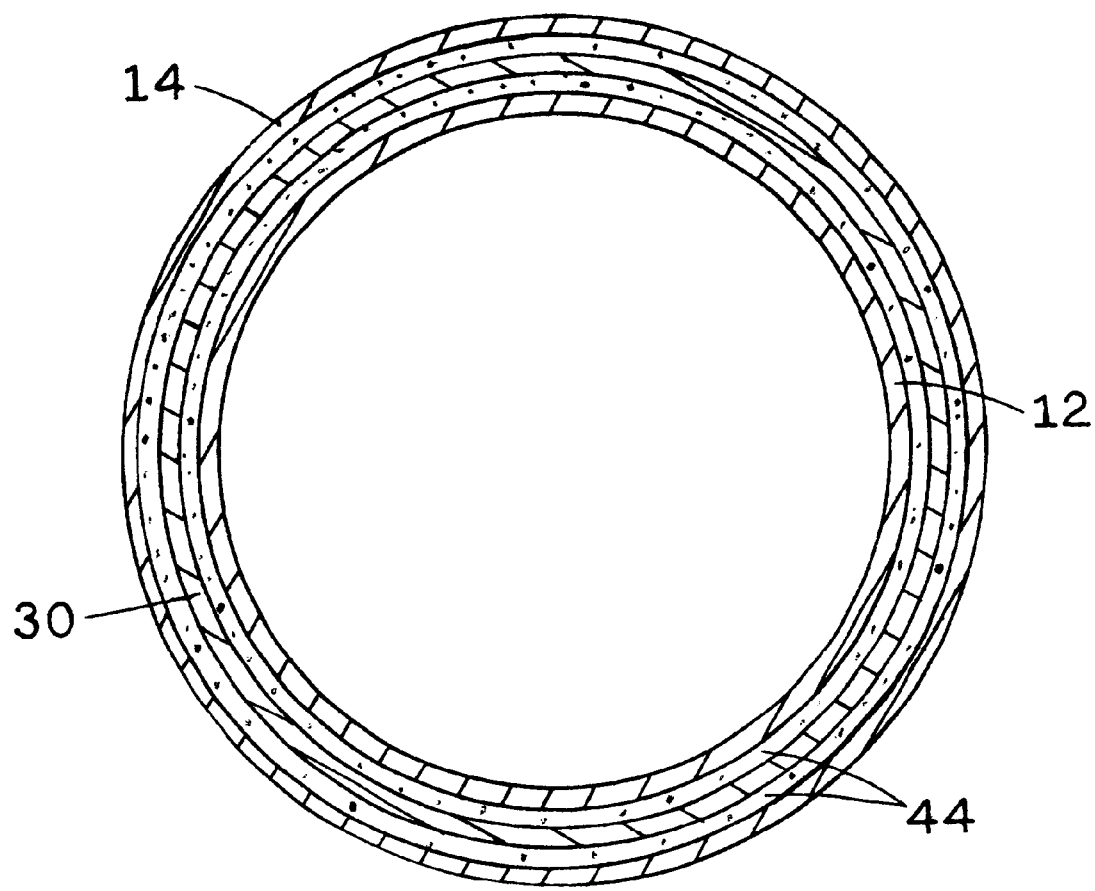
FIG. 4A is a cross-section of a manifold pipe assembly taken at 4A-4A of FIG. 4.

FIG. 2 illustrates, pictorially, exhaust systems 32 built using the prior art manifold pipe assemblies of FIGS. 1 and 1A, and showing the general nature of such exhaust systems. Such exhaust system 32 includes a manifold bracket 18 which is mounted to the engine. A plurality of jacketed manifold pipe assemblies 34 are mounted such as by welding to the manifold bracket at apertures 20 in the manifold bracket such that when the manifold bracket is mounted to the engine, the manifold pipes are aligned with respective exhaust passages of the engine, thus to receive exhaust from the engine at each of the engine exhaust passages 36 (FIG. 4). Thus, distal ends 26 of manifold pipes 12 generally abut or closely approach the respective exhaust passages of the engine. Accordingly, mounting a manifold pipe assembly to the respective exhaust passage, through bracket 18, creates a path along which heat and hot gases can be conveyed through manifold pipe 12 toward an ambient environment to which the exhaust gases can be vented.

Ends 38 of the jacketed manifold pipes 34, remote from bracket 18, preferably converge on each other and are received at a common inlet orifice of exhaust pipe 40. Exhaust pipe 40 thus collects the exhaust gases from the several manifold pipes and further conveys the collective exhaust gases away from engine 19.

Water enters cooling cavities 16 through inlet pipes 24 on respective jacketed manifold pipe assemblies 34, flows through cavities 16 along a path parallel to the exhaust gases and generally away from the engine, and departs cavities 16 through conventional more remote outlets 35.

As an alternative, the cooling water can flow in the opposite direction, generally opposite the direction, both in prior art designs and in the invention, of flow of engine exhaust gases, exiting e.g. cooling chamber 16 at what is labeled and defined as inlet pipe 24.

Exhaust systems of the invention have the same general configuration of manifold pipe assemblies and exhaust pipes as in the prior art, e.g. FIG. 2, with the general exception that the liquid-jacketed manifold pipe assemblies of the invention are configured according to the inventive discoveries described herein.

FIGS. 3 and 4, in combination, illustrate a first embodiment of jacketed manifold pipe assemblies 34 of the invention, which are used in exhaust systems like that shown in FIG. 2, but employing the respective manifold pipe assemblies 34 of the invention. Referring to FIGS. 3 and 4, jacketed manifold pipe assembly 34 includes a manifold pipe 12, a jacket pipe 14, and a spacing ring 30. Distal end 26 of manifold pipe 12 extends into and preferably through aperture 20 in manifold bracket 18. End 26 of pipe 12 is attached to bracket 18 e.g. by welding the pipe to the manifold bracket thus to close that portion of aperture 20 which is disposed outwardly of manifold pipe 12. Aperture 20 is sized accordingly, for receiving pipe 12 and for efficient welding of pipe 12 to bracket 18 at end 26 of the pipe.

Distal end 28 of jacket pipe 14 is preferably displaced from the manifold end of the manifold pipe, at locus of closest approach, by a substantial distance such as about 0.5 inch to about 3 inches, defining a displaced cooling chamber 42. In some embodiments, locus of distal end 28 generally coincides with the manifold end of the manifold pipe. However, in such embodiments, it is difficult to suitably configure the manifold pipe assembly, and to assemble the manifold pipe assembly to manifold bracket 18 because inlet pipe 24 must be disposed closely adjacent closed end 46, which most closely approaches bracket 18. Because of the difficulty of getting the water inlet pipe close enough to end 46 to maintain proper water circulation in end chamber portion 47, described more fully hereinafter, such embodiments where end 28 of jacket pipe 14 coincides with end 26 of the manifold pipe is not preferred, though such configurations can be operable.

The inlet pipe is typically not economically placed closer than 0.5 inch to the manifold bracket, and greater than 3 inches does not well achieve the desired thermal stress relief. Within the above ranges, a preferred spacing is about 0.75 inch to about 2 inches, in order to accommodate both effective cooling and ease of manufacture, installation, and maintenance. However, as indicated above, in some implementations, jacket pipe 14, and thus end 28 of pipe 14, approach and can reach manifold bracket 18. The critical feature, though, is that water pipe 24 be so closely adjacent end 46, and be suitably configured in combination with end 46, that cooling water flow at a face or wall at end 46 is sufficient to preclude substantial amounts of water vapor forming and staying in end chamber portion 47.

Thus, so long as pipe 24 can be configured suitably, and placed sufficiently close to end 46, and so long as the inner configuration of end 46 is compatible with not trapping or harboring such water vapor as may be formed inside end chamber portion 47, end 46 can be located any distance, including no distance, from end 26 of manifold pipe 12.

The end of the cooling chamber which is closest to the manifold bracket is preferably displaced from manifold bracket 18 by approximately the distance end 28 of pipe 14 is displaced from the manifold bracket. In the embodiments of FIGS. 3 and 4, spacing ring 30 is disposed inside jacket pipe 14 and over manifold pipe 12 at distal end 28, thus maintaining a constant diameter on cooling chamber 42 up to the enclosed end 45 of ring 30, which becomes closed end 46 in the manifold pipe assembly, and substantially to distal end 28 of the jacket pipe. Weld 44 provides closure of cooling chamber 42 at distal end 28 of pipe 14, and thus forms closed end 46 at end 45 of ring 30. As illustrated in FIG. 4, weld 44 provides the closure, closing both the circular joint between spacing ring 30 and manifold pipe 12, and concomitantly closing the circular joint between ring 30 and jacket pipe 14, as well as providing a solid closure bridge between the outer surface of end 28 of pipe 14, across the outer surface of ring 30, and onto manifold pipe 12, and thus closing off and creating the respective end of cooling chamber 42, creating the interiorly-disposed closed end 46 of cooling chamber 42.

FIGS. 3 and 4 illustrate a primary benefit of the invention in that the closed end 46 of chamber 42 which is most closely adjacent, though preferably substantially spaced from, manifold bracket 18 is located quite close to inlet 24. With the jacketed manifold pipe assembly 34 structured such that closed end 46 is adjacent inlet pipe 24, the movement of water coming into cooling chamber 42 at inlet pipe 24 is sufficient to maintain movement of the water at closed end 46.

Cooling chamber 42, and especially that portion of the cooling chamber between inlet pipe 24 and closed end 46, is thus sufficiently cooled by the incoming water that hot spots do not develop as in prior art constructions. While choosing to not be bound by theory, the inventors contemplate that inlet pipe 24 is sufficiently close to closed end 46 that boundary layer fluid flow, or eddy flow, or turbulence of the water flow, or other water flow characteristics, accompanying the water entering at inlet pipe 24, keeps the water at closed end 46 moving sufficiently that suitable cooling occurs at closed end 46 without substantial vaporization of the liquid; and that what vaporization does occur is sufficiently transient and is carried off by the remaining portion of unvaporized liquid which passes by chamber portion 47. In addition, the inventors contemplate that the residence time of water at closed end 46 is sufficiently short as to preclude vaporization of deleterious quantities of water at closed end 46.

The extremity/reach of end 46 toward bracket 18 should be as close as practical to inlet pipe 24. However, inlet pipe 24 is typically joined to jacket 14 e.g. by welding before jacket pipe 14 is slid onto manifold pipe 12. Thus, end 28 of jacket pipe 14 should be sufficiently distanced from inlet pipe 24 so that inlet pipe 24 is not physically distorted by the heat used to subsequently create weld 44. In view of the tension between wanting to minimize the length of chamber 42 between pipe 24 and end 46, while not tolerating distortion at inlet pipe 24, a typical length of closed end 46, between inlet pipe 24 and the blind end face of closed end 46, is about 0.12 inch to about 0.38 inch, optionally about 0.19 inch. Shorter or longer distances can be accommodated in combination with special treatments of e.g. water flow in cooling chamber 46 during routine use or localized cooling during fabrication of weld 44.

In the embodiments where closed end 46 is substantially displaced from distal end 26 of manifold pipe 12, the inventors have observed what appears to be temperature-related color differentiation indications on the metal of manifold pipe 12, between bracket 18 and pipe 14, during routine use of exhaust systems of the invention, suggesting that the cooling effected in chamber 42 is being conducted from chamber 42 upstream of flow of the exhaust gases, along pipe 12 and toward bracket 18, such that initial cooling effect of the water is obtained between pipe 14 and bracket 18. Namely, pipe 12 appears to have a substantial temperature gradient between bracket 18 and chamber 42, created by the cooling effect of the water in chamber 42.

While a minor amount of cooling occurs naturally as heat is transferred to air about pipe 12 between bracket 18 and pipe 14, the invention produces substantial additional cooling of pipe 12 as a result of heat dissipated through chamber 42 and because the size of end portion 47 adjacent closed end 46 is sufficiently short to ensure good liquid water contact with pipe 12 proximate closed end 46 along with the corresponding excellent cooling affect of liquid water at that critical locus.

Namely, the inventors have discovered that heat drawn from pipe 12 at and adjacent closed end 46 draws heat by conduction from upstream of the pipe closer to bracket 18, thus cooling pipe 12 upstream of pipe 14. Such cooling effect of the water flowing through chamber 42 reduces the temperature of pipe 12 at weld 44. Such reduction of temperature of pipe 12 at weld 44 reduces the temperature differential between pipes 12 and 14, correspondingly reducing the thermally-induced stress on weld 44, and thereby contributing to increased use life of jacketed manifold pipe assembly 34.

In view of the invention herein described, applicants contemplate that, in a similar structure but wherein end chamber portion 47 of cooling chamber 42, defined between the blind end surface of closed end 46 and inlet pipe 24, is so long or is so configured as to enable the water to vaporize in such chamber portion 47, the above-mentioned moderating affect on the stress at weld 44 will not be achieved, whereby premature failure can be expected e.g. at weld 44. Thus, the configuration of chamber 42, between pipes 12, 14, should be so designed up to the blind end surface of closed end 46 as to avoid deleterious quantities of vaporization in closed end 46. Accordingly, a substantially tapered closed end 46 does not provide the desired use life and is, accordingly, outside the scope of this invention.

Another benefit of the structure of FIG. 4 over the structure of FIG. 1 relates to specific configuration of end chamber portion 47. In general, pressure exerted inside the respective cooling chamber is exerted on the end structure as well as on the rest of the chamber as a whole. Turning now to FIGS. 1 and 4, the wedge shaped terminus of end 46 in FIG. 1 applies internal pressure at substantially a linear end edge about the circumference of cooling chamber 42, whereas the square-shaped terminus of end 46 in FIG. 4 applies the corresponding force over the full depth of the constant maximum diameter chamber, between pipes 12 and 14. Thus, the FIG. 4 structure exerts the water pressure against a generally perpendicular surface while the FIG. 1 structure exerts corresponding pressure against the inside of a hollow wedge.

Figure 5:
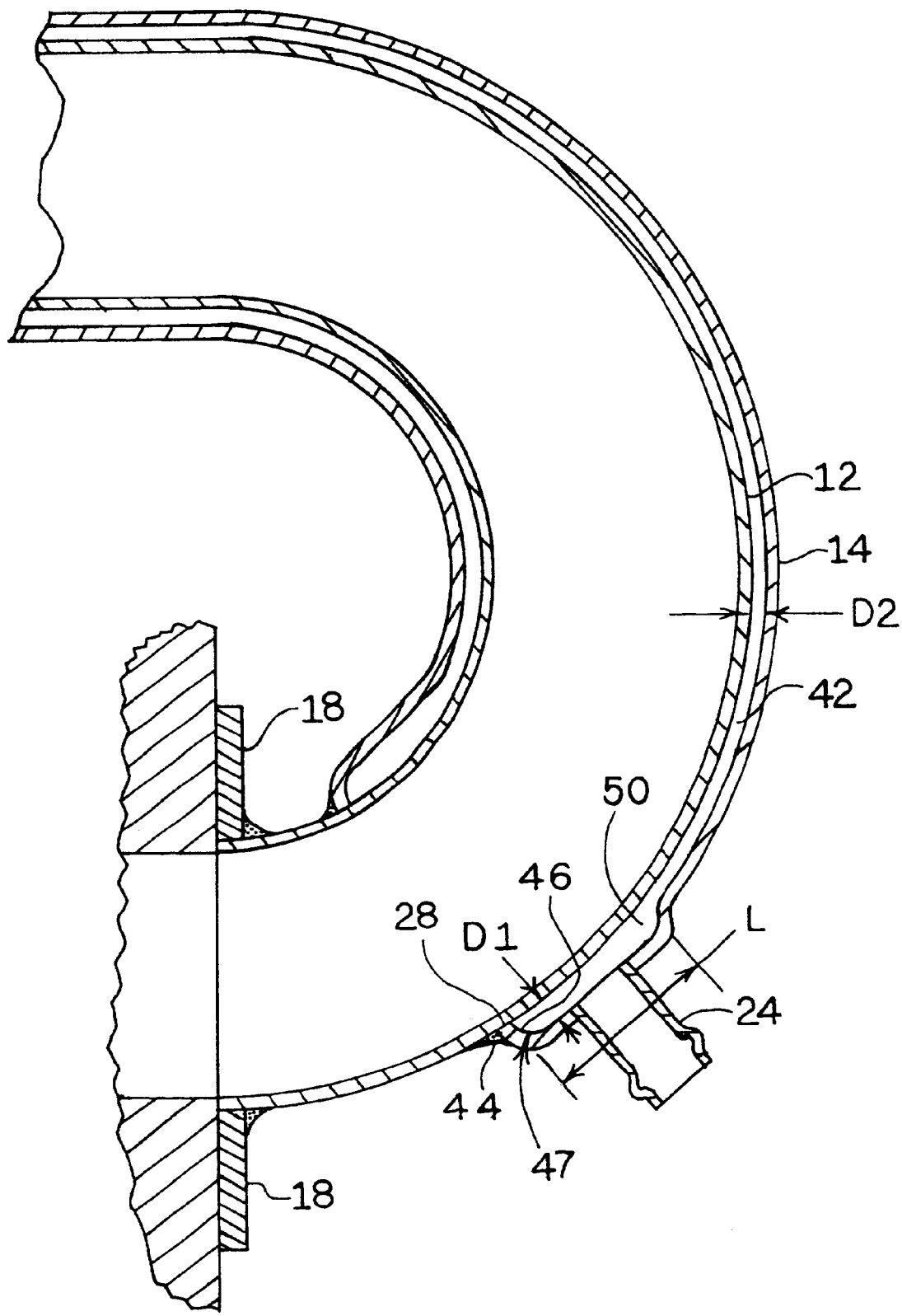
FIG. 5 is a cross-section of a second embodiment of manifold pipe assemblies of the invention.
Figure 6:
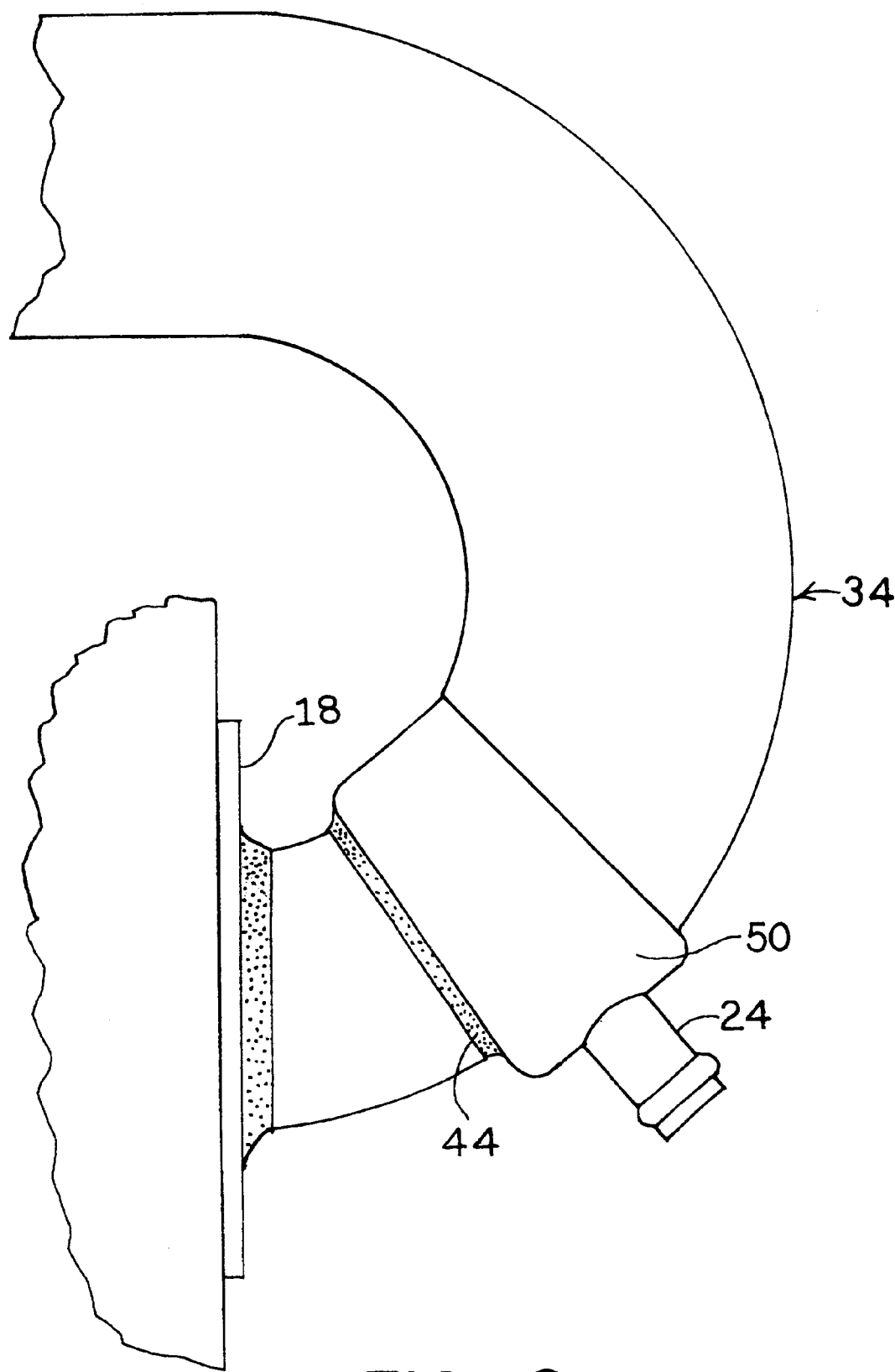
FIG. 6 is an external side view of the manifold pipe assembly shown in FIG. 5.

FIGS. 5 and 6 illustrate another preferred embodiment of the invention. As in the embodiment of FIGS. 3 and 4, distal end 28 of the jacket pipe, and thus closed end 46 of cooling chamber 42, are displaced from manifold bracket 18, and thus from distal end 26 of pipe 12, by about 0.5 inch to about 3 inches, preferably about 0.75 inch to about 2 inches. As with the embodiments of FIGS. 3 and 4, closure of the joint at pipe end 28 to define end chamber portion 47 is effected by a weld 44, extending about the entirety of the circumference of pipes 12, 14 at such joint.

The primary benefit of displacing end 28 from manifold bracket 18 is in bringing the closed end 46 of cooling chamber 42 into general alignment with inlet pipe 24, thus to reduce or substantially eliminate the dead end, and correspondingly to eliminate the failure to maintain liquid water flow in end chamber portion 47 as illustrated at cooling chamber 16 in FIGS. 1 and 1A.

In addition to displacing closed end 46 of chamber 42 as in FIGS. 3 and 4, and in addition to having inlet pipe 24 close to closed end 46 as in FIGS. 3 and 4, in this embodiment, chamber 42 includes an enlarged portion or collar on pipe 14, providing an accumulation reservoir 50 at and adjacent the closed end, and associated with inlet pipe 24. Accumulation reservoir 50 defines a relatively larger diameter portion of the cooling chamber at and adjacent closed end 46, while a relatively lesser diameter portion of the cooling chamber is provided downstream of the accumulation reservoir. The lesser diameter, and thus lesser cross-section, portion of the cooling chamber is designed according to the same principles, e.g. depth between pipes 12, 14, used to design cooling chamber 42 of e.g. the embodiments of FIGS. 3 and 4 which have no such accumulation reservoir 50.

The larger diameter, and thus larger cross-section, of the accumulation reservoir has the effect of increasing the residence time of water in the accumulation reservoir, and of reducing size constrictions which might tend to restrict water flow. The increased residence time results in the water absorbing more heat per length of the manifold pipe at the hot end of the manifold pipe, than the amount of heat absorbed by a jacketed manifold pipe (FIGS. 3 and 4) which has no accumulation reservoir. Thus, the increased cooling capacity is provided at that place along pipe 12 having the greatest need for cooling capacity.

The capacity for cooling in cooling chamber 42 is related to, among other factors, the cross-sectional area of the chamber, and the flow rate of the water. In general, the greater the length, and the greater the maximum diameter, of the accumulation reservoir, the greater the cooling effect of the reservoir for a given rate of water flow.

Preferred designs for cooling chamber 42 and for accumulation reservoir 50 relate the depth "D1" of the chamber at the accumulation reservoir to the diameter of pipe 12. Preferred relationship for accumulation reservoir 50 is that the ratio of the depth "D1" of the chamber at the accumulation reservoir to the outside diameter of pipe 12 is about 0.05/1 to about 0.3/1, preferably about 0.10/1 to about 0.25/1, more preferably about 0.13/1 to about 0.22/1. A most preferred depth "D1" for a manifold pipe having an outside diameter of about 1.5 inch to 2.4 inches is about 0.25 inch, whereas a preferred depth "D1" for a manifold pipe having an outside diameter of about 3 inches is about 0.63 inch.

The above relationships are exemplary only. It will be understood that any differential between the depth "D1" of the accumulation reservoir and the depth "D2" of cooling chamber 42 outside reservoir 50 provides some corresponding increased residence time and cooling effect. It will similarly be understood that there is no theoretical upper limit to depth "D1;" albeit greater depths "D1" than the stated preferred depths occupy more of the precious space near the engine and may not provide any additional cooling benefit.

For a given working environment, wherein a preferred depth "D1" is known for a first diameter of manifold pipe 12, the known ratio of depth "D1" to outside diameter of pipe 14 can be applied in general, as a starting point, to other manifold pipes used in the same work environment, though such relationships typically need to be modified somewhat in order to reach optimum relationship conditions. Such modification, though, is well within the capability of the those skilled in the art.

Length "L" of accumulation reservoir 50 is also related to diameter, but less stringently so. A minimum ratio of length of accumulation reservoir 50 to diameter of pipe 12, of e.g. about 0.3/1 generally provides incremental benefit. However, a greater ratio is generally desired in order to provide substantial benefit. Accordingly, a ratio of greater than 0.3/1 is preferred, such as about 0.5/1 to about 2/1, preferably about 0.6/1 to about 1.5/1. Thus, the accumulation reservoir associated with e.g. a 3 inch diameter manifold pipe 12 typically has a length "L" of about 1 inch to about 4.5 inches.

As with depth analysis, length "L" can be larger than the stated preferred lengths, but generally does not provide substantial incremental improvements in cooling.

As a further design parameter, the ratio of the length "L," of the accumulation reservoir, to the depth "D1" should be about 0.5/1 to about 15/1. Less than 0.5/1 ratio provides less than the desired amount of cooling for a given volume in the accumulation reservoir. Greater than 15/1 ratio provides sufficient cooling but occupies more space in the engine compartment without providing sufficient added cooling benefit to justify such use of the space. Preferred ratios are about 4/1 to about 10/1, thereby to obtain efficient cooling effect of the accumulation reservoir without overall taking up more space than necessary.

The shape illustrated for accumulation reservoir 50 is not limiting. While the illustrated shape is that of an elongated reservoir, wherein a cross-section as in FIG. 5 suggests a generally rectangular reservoir, other shapes can be used, such as shapes more representative of e.g. ovals and/or circles in views corresponding to the cross-section of FIG. 5.

Referring again to FIG. 5, end 28 of jacket pipe 14 is shown perpendicular to the outer surface of pipe 12. The perpendicular orientation, in combination with the jacket pipe extending away from the outer surface along an arcuate path enables pipe 14 to expand and contract, thus to flex especially along the arcuate portion of the pipe (FIG. 5), according to thermal stresses without excessively stressing the pipe at locations displaced from end 28, and while limiting the stresses exerted on the joint at end 28 to those corresponding to expansion immediately adjacent the joint. The inventors contemplate that approach angles of end 28 at pipe 12, of about 70 degrees to about 110 degrees, work satisfactorily though the perpendicular approach is generally preferred. By contrast, in a wedge-shaped joint (FIG. 1), separation-strength stresses are more easily exerted on, and applied to. the joint joining pipes 12 and 14 by expansion of pipe 14 at the joint, as well as by expansions of pipe 14 adjacent the joint and by the inherently weaker structure of a joint fabricated at the illustrated smaller angle of approach.

By contrast, in the non-wedge-shaped angular joint of FIG. 5, expansions adjacent the joint are distributed away from the joint and are thus dissipated by angular flexing of pipe 14 in the cooling chamber such as at the accumulation reservoir rather than placing the bulk of the stress on the joint. Namely, thermal stresses on pipe 14 tend to cause variations in the angle between edge 28 and pipe 12. In addition, thermal stresses tend to expand the diameter of pipe 14 at that portion of pipe 14 which generally parallels pipe 12 in the reservoir. To the extent the stress response occurs in the parallel portion of the wall of pipe 14, a lesser amount, if any, of the stress is borne by the joint whereby the joint is generally less affected in the embodiments of FIGS. 5 and 6 than are joints of the structures illustrated in FIGS. 1, 1A, and 2 which are exposed to the same hot gas environment.

Referring to the drawings specifically representing the invention, e.g. FIGS. 3-4 and 5-6, preferred ratio of depth of the accumulation reservoir to diameter of the pipe is about 0.10/1 to about 0.25/1. Typical average depth "D2" of chamber 42 away from any accumulation reservoir is about 0.13 inch where manifold pipe 12 is e.g. about 1 inch diameter. Depth "D2" is e.g. 0.63 inch where manifold pipe 12 is up to about 3 inches diameter. Using the above noted depths at 1 inch pipe diameter and 3 inches pipe diameter, preferred depth corresponds to an approximately linear relationship to the diameter of pipe 12. Thus, for a 2 inch diameter manifold pipe, a preferred depth "D2" is about 0.38 inch. Smaller depths "D2" such as 0.06 inch can be used where manifold pipe 12 is respectively smaller in diameter, whereby jacket pipe 14 can have an inside diameter as small as 0.06 inch greater than the outside diameter of the manifold pipe.

Accordingly, starting with "D2" being 0.13 inch for a 1 inch nominal diameter pipe 12, depth "D2" increments at the rate of about 0.25 inch for each increase of 1 inch in nominal diameter of pipe 12, whereby the jacket pipe has an inside diameter at least 0.25 inch greater than each incremental inch of the outside diameter of manifold pipe 12.

In general, depth "D1" of the accumulation reservoir is greater than depth "D2" elsewhere in the cooling chamber. The larger the ratio, generally the greater the relative cooling affect of accumulation reservoir 50, while the smaller the ratio, generally the less physical space demanded/occupied by the accumulation reservoir, though the cooling affect is also less.

One of the functions of accumulation reservoir 50 is to provide for a degree of uniformity in distribution of the water about the circumference of cooling chamber 42, as the water enters the cooling chamber. To that end, the enlargement of D1 as compared to D2 encourages the water to fill up the accumulation reservoir in deference to the smaller passage opening D2 downstream of the accumulation reservoir. Thus the larger the ratio D1/D2, to a degree, the greater the prospect that water entering cooling chamber 42 at inlet pipe 24 will in fact travel about the full circumference of manifold pipe 12 before exiting the accumulation reservoir and entering the narrower passage D1 outside the accumulation reservoir. A suitable measure of such distribution is to measure longitudinal flow of cooling chamber water at various locations about the circumference of manifold pipe 12. To the extent the rate of water flow is generally consistent as measured at various places about the circumference of pipe 12, the desired distribution has been achieved. Such measurements can, of course, be made at multiple locations along the length of the cooling chamber, as desired.

In order to achieve the above desired distribution of water about the circumference of manifold pipe 12, ratio of D1/D2 is generally, though not necessarily, about 2/1 to 3/1. Minimal benefits of the accumulation reservoir can be achieved with D1/D2 ratios of at least about 1.2/1. Typical ratio of D1/D2 is about 1.25/1 to about 4/1, preferably about 1.5/1 to about 3/1.

Depth D1 is only one of several parameters which coact together in determining the effective rate of removal of heat from manifold pipe 12. Accordingly, the specific depth D1 as well as length and diameter of the accumulation reservoir, are determined by considering such other parameters as temperature of the exhaust gases entering manifold pipes 12, volume and flow rate of the exhaust gases, temperature and flow rate of water entering the cooling chamber, space available near the engine exhaust ports, and the like.

Throughout the drawings, depth "D2" which is a subset of depth "D1," is illustrated as having a constant depth for a given manifold pipe assembly. While constant depth is easily fabricated and is therefore preferred, depth "D2" can be varied along the length of the pipe assembly, including at depths "D1" within an accumulation reservoir. In addition, depth "D2," and correspondingly "D1," can vary about the circumference of the pipe assembly at a given locus, and can vary according to a first set of data at a first locus along the length of the pipe assembly and can vary about the circumference according to a second different set of data at a second locus along the length of the pipe assembly.

Manifold pipe 12, jacket pipe 14, and spacing ring 30 are made of materials resistant to thermal breakdown and corrosion under the operating conditions in which exhaust systems of the invention are expected to be used. In addition, such materials must have good strength and good durability. Desirable materials which meet such criteria are various ones of the steels, especially stainless steel, and more preferably a stainless steel known in the trade as 316L stainless steel or 317 stainless steel. While other materials can be used, such as titanium, 316L stainless and 317 stainless steel provide a cost effective balance of properties and good capacity for strength and durability.

As used herein, "high output" engines typically refers to engines which develop at least 350 horsepower. Exhaust structures and assemblies of the invention are well adapted for use in engines which can develop 1000 horsepower, 1500 horsepower, 2500 horsepower, and more.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A manifold pipe assembly for receiving hot gases from a heat source, and conveying such hot gases from the heat source toward a lower temperature environment, said manifold pipe assembly comprising:

(a) a manifold pipe having a first inlet end and a single inlet opening for receiving hot gases from the heat source at the inlet end, and a first outlet end and an outlet opening at the first outlet end, and a length between the first inlet end and the first outlet end, said manifold pipe defining a gas path for conveying hot gases from the single inlet opening to the outlet opening;

(b) a jacket pipe disposed outwardly of, and encompassing, said manifold pipe along a portion of the length of said manifold pipe, said jacket pipe having a second inlet end disposed toward the first inlet end of said manifold pipe, and a second outlet end disposed toward the first outlet end of said manifold pipe, said jacket pipe being closed about and secured to said manifold pipe at the second inlet end of said jacket pipe, thereby to form a cooling chamber between the manifold pipe and the jacket pipe, the cooling chamber having a closed inlet end, the second inlet end of said jacket pipe being spaced from the first inlet end of said manifold pipe, such that a portion of the length of said manifold pipe adjacent the first inlet end thereof is not encompassed by said jacket pipe; and (c) an inlet pipe providing liquid communication into the cooling chamber, a closed end chamber portion of the cooling chamber being defined between said inlet pipe and a face of the cooling chamber disposed toward said first end of said manifold pipe, said inlet pipe being sufficiently close to the inlet end of the cooling chamber in combination with the closed end chamber portion being suitably configured as to maintain sufficient flow of cooling liquid at the inlet end, into and through the closed end chamber portion, to preclude development of localized hot spots on said manifold pipe adjacent the cooling chamber when cooling water is routinely passing through the cooling chamber during routine operating conditions of said pipe assembly.

2. A manifold pipe assembly as in claim 1, said jacket pipe having an inside diameter at least 0.12 inch greater than the outside diameter of said manifold pipe.

3. A manifold pipe assembly as in claim 1, said jacket pipe having an inside diameter at least 0.25 inch greater than the outside diameter of said manifold pipe.

4. A manifold pipe assembly as in claim 1, the cooling chamber having a depth D2 measured between an outer diameter of said manifold pipe and an inner diameter of said jacket pipe, the ratio of the depth of the cooling chamber to the outside diameter of the manifold pipe, at locations away from the inlet end of the cooling chamber, being about 0.05/1 to about 0.3/1.

5. A manifold pipe assembly as in claim 1, the cooling chamber having a depth D2 measured between an outer diameter of said manifold pipe and an inner diameter of said jacket pipe, the ratio of the depth of the cooling chamber to the outside diameter of the manifold pipe, at locations away from the inlet end of the cooling chamber, being about 0.1/1 to about 0.25/1.

6. A manifold pipe assembly as in claim 1 wherein said second inlet end of said jacket pipe is displaced from the first inlet end of the manifold pipe, at locus of closest approach of said jacket pipe to the first inlet end of said manifold pipe, by a distance of about 0.5 inch to about 3 inches.

7. A manifold pipe assembly as in claim 1, and including, as a relatively enlarged cross-section portion of said jacket pipe, an accumulation reservoir as part of said cooling chamber proximate the second inlet end of said jacket pipe, said accumulation reservoir being effective to increase residence time of cooling liquid in the cooling chamber at the accumulation reservoir.

8. A manifold pipe assembly as in claim 7 wherein the ratio D1/D2 is about 1.2/1 to about 4/1.

9. A manifold pipe assembly as in claim 7 wherein the ratio D1/D2 is about 1.5/1 to about 3/1.

10. A manifold pipe assembly as in claim 1 wherein a distance between the inlet end of the manifold pipe, and the closed end chamber portion is no more than about 0.38 inch.

11. A manifold pipe assembly as in claim 1 wherein, in routine hot gas transfer operation, the manifold pipe exhibits temperature-related color differentiation indications at an outer surface thereof between the first end of said manifold pipe and the second inlet end of said jacket pipe.

12. A manifold pipe assembly as in claim 1 defined in combination with an internal combustion engine designed and configured to develop at least 350 horsepower.

13. A manifold pipe assembly as in claim 1 defined in combination with an internal combustion engine designed and configured to develop at least 1000 horsepower.

14. A manifold pipe assembly as in claim 1 defined in combination with an internal combustion engine designed and configured to develop at least 1500 horsepower.

15. A manifold pipe assembly as in claim 1 defined in combination with an internal combustion engine designed and configured to develop at least 2500 horsepower.

16. A manifold pipe assembly for receiving hot gases from a heat source, and conveying such hot gases from the heat source toward a lower temperature environment, said manifold pipe assembly comprising:

(a) a manifold pipe having a first inlet end and a first outlet end, and a length between said first inlet end and said first outlet end, said manifold pipe defining a gas path for conveying hot gases from the first inlet end to the first outlet end;

(b) a jacket pipe disposed outwardly of, and encompassing, said manifold pipe along a portion of the length of said manifold pipe, said jacket pipe having a second inlet end disposed toward the first inlet end of said manifold pipe, and a second outlet end disposed toward the first outlet end of said manifold pipe, said jacket pipe being closed about and secured to said manifold pipe at the second inlet end of said jacket pipe, thereby to form a cooling chamber between the manifold pipe and the jacket pipe, the cooling chamber having a closed inlet end in the vicinity of the inlet end of said jacket pipe, the cooling chamber having (i) a first average depth measured between an outer diameter of said manifold pipe and an inner diameter of said jacket pipe, and (ii) an accumulation reservoir at the inlet end of the cooling chamber, generally surrounding said manifold pipe, said accumulation reservoir having a second depth at least 1.2 times as great as the first depth; and (c) an inlet pipe providing liquid communication into the accumulation reservoir, a closed end chamber portion of the cooling chamber being defined between said inlet pipe and an end surface of the cooling chamber disposed toward said first end of said manifold pipe, the accumulation reservoir providing for increased residence time of the cooling liquid adjacent the inlet end of the cooling chamber, compared to the relative residence time of the cooling liquid at respective portions, of equal longitudinal dimensions, along the length of the cooling chamber and away from the accumulation reservoir.

17. A manifold pipe assembly as in claim 16, said jacket pipe having an inside diameter at least 0.12 inch greater than the outside diameter of said manifold pipe.

18. A manifold pipe assembly as in claim 16, said jacket pipe having an inside diameter at least 0.25 inch greater than the outside diameter of said manifold pipe.

19. A manifold pipe assembly as in claim 16, the cooling chamber having a depth D2 measured between an outer diameter of said manifold pipe and an inner diameter of said jacket pipe, the ratio of the depth of the cooling chamber to the outside diameter of the manifold pipe, at locations away from said accumulation reservoir, being about 0.05/1 to about 0.3/1.

20. A manifold pipe assembly as in claim 16, the cooling chamber having a depth D2 measured between an outer diameter of said manifold pipe and an inner diameter of said jacket pipe, the ratio of the depth of the cooling chamber to the outside diameter of the manifold pipe, at locations away from said accumulation reservoir, being about 0.1/1 to about 0.25/1.

21. A manifold pipe assembly as in claim 16, said jacket pipe, and thus said cooling cavity, including said accumulation reservoir, being disposed toward but spaced from the first inlet end of said manifold pipe.

22. A manifold pipe assembly as in claim 16, said manifold pipe having a first outside diameter, said accumulation reservoir having a maximum depth extending outwardly of the outside diameter of said manifold pipe, the ratio of the maximum depth of said accumulation reservoir to the outside diameter of said manifold pipe being about 0.05/1 to about 0.3/1.

23. A manifold pipe assembly as in claim 16, said manifold pipe having a first outside diameter, said accumulation reservoir having a maximum depth extending outwardly of the outside diameter of said manifold pipe, the ratio of the maximum depth of said accumulation reservoir to the outside diameter of said manifold pipe being about 0.1/1 to about 0.25/1.

24. A manifold pipe assembly as in claim 23 wherein the ratio D1/D2 is about 1.2/1 to about 4/1.

25. A manifold pipe assembly as in claim 23 wherein the ratio D1/D2 is about 1.5/1 to about 3/1.

26. A manifold pipe assembly as in claim 16, said manifold pipe having a length, the ratio of the length of said accumulation reservoir to the outside diameter of said manifold pipe being about 0.3/1 to about 2/1.

27. A manifold pipe assembly as in claim 16, said manifold pipe having a length, the ratio of the length of said accumulation reservoir to the outside diameter of said manifold pipe being about 0.6/1 to about 1.5/1.

28. A manifold pipe assembly as in claim 16, said accumulation reservoir having a maximum depth disposed outwardly of an outside diameter of said manifold pipe, and a length, and a length/depth ratio of about 0.5/1 to about 15/1.

29. A manifold pipe assembly as in claim 16, said accumulation reservoir having a maximum depth disposed outwardly of an outside diameter of said manifold pipe, and a length, and a length/depth ratio of about 4/1 to about 10/1.

30. A manifold pipe assembly as in claim 16, said second inlet end of said jacket pipe being joined to an outer surface of said manifold pipe at a joint having an approach angle of about 70 degrees to about 110 degrees, and extending away from the outer surface of said manifold pipe along an arcuate path, thereby enabling said jacket pipe to flex according to thermal stresses placed thereon while retaining acceptable, levels of stress at the joint.

31. A manifold pipe assembly as in claim 16 wherein said second inlet end of said jacket pipe is displaced from the manifold end of the manifold pipe by a distance of about 0.5 inch to about 3 inches at locus of closest approach.

32. A manifold pipe assembly as in claim 16, and including, as a relatively enlarged cross-section portion of said jacket pipe, an accumulation reservoir as part of said cooling chamber proximate the second inlet end of said jacket pipe, said accumulation reservoir being effective to increase residence time of cooling liquid in the cooling chamber at the accumulation reservoir.

33. A manifold pipe assembly as in claim 16 wherein a distance between the inlet pipe and the face of the closed end chamber portion is no more than about 0.38 inch.

34. A manifold pipe assembly as in claim 16 wherein, in routine hot gas transfer operation, the manifold pipe exhibits temperature-related color differentiation indications at an outer surface thereof between the first inlet end of said manifold pipe and the second inlet end of said jacket pipe.

35. A manifold pipe assembly as in claim 16 defined in combination with an internal combustion engine designed and configured to develop at least 350 horsepower.

36. A manifold pipe assembly as in claim 16 defined in combination with an internal combustion engine designed and configured to develop at least 1000 horsepower.

37. A manifold pipe assembly as in claim 16 defined in combination with an internal combustion engine designed and configured to develop at least 1500 horsepower.

38. A manifold pipe assembly as in claim 16 defined in combination with an internal combustion engine designed and configured to develop at least 2500 horsepower.

39. A manifold pipe assembly as in claim 16, said inlet pipe being sufficiently close to the inlet end of the cooling chamber to maintain sufficient flow of cooling liquid at the inlet end into and through the closed end chamber portion, to preclude substantial vaporization of cooling water at the closed end chamber portion under routine operating conditions of the pipe assembly.

40. A manifold pipe assembly for receiving hot gases from a heat source, and conveying such hot gases from the heat source toward a lower temperature environment, said manifold pipe assembly comprising:

(a) a manifold pipe having a first inlet end and a first outlet end, and a length between the first inlet end and the first outlet end, said manifold pipe defining a gas path for conveying hot gases from the first inlet end to the first outlet end;

(b) a jacket pipe disposed outwardly of, and encompassing, said manifold pipe along a portion of the length of said manifold pipe, said jacket pipe having a second inlet end disposed toward the first inlet end of said manifold pipe, and a second outlet end disposed toward the first outlet end of said manifold pipe, said jacket pipe being closed about and secured to said manifold pipe at the second inlet end of said jacket pipe, with the second inlet end of the jacket pipe approaching the manifold pipe along an arcuate path generally defining an angle of about 70 degrees to about 110 degrees at a joinder of the jacket pipe to the manifold pipe, thereby to form a cooling chamber between the manifold pipe and the jacket pipe, the second inlet end of said jacket pipe being spaced from the first inlet end of said manifold pipe, such that a portion of the length of said manifold pipe adjacent the first inlet end thereof is not encompassed by said jacket pipe; and (c) an inlet pipe providing liquid communication into the cooling chamber, a closed end chamber portion of the cooling chamber being defined between said inlet pipe and a face of the cooling chamber disposed toward said first end of said manifold pipe.

41. A manifold pipe assembly as in claim 40, said inlet pipe being sufficiently close to the inlet end of the cooling chamber in combination with the closed end chamber portion being suitably configured as to maintain sufficient flow of cooling liquid at the inlet end, into and through the closed end chamber portion, to preclude development of localized hot spots on said manifold pipe adjacent the cooling chamber when cooling water is routinely passing through the cooling chamber during routine operating conditions of said pipe assembly.

42. A manifold pipe assembly as in claim 40, said jacket pipe having an inside diameter at least 0.12 inch greater than the outside diameter of said manifold pipe.

43. A manifold pipe assembly as in claim 40, said jacket pipe having an inside diameter at least 0.25 inch greater than the outside diameter of said manifold pipe.

44. A manifold pipe assembly as in claim 40, the cooling chamber having a depth D2 measured between an outer diameter of said manifold pipe and an inner diameter of said jacket pipe, the ratio of the depth of the cooling chamber to the outside diameter of the manifold pipe, at locations away from the inlet end of the cooling chamber, being about 0.05/1 to about 0.3/1.

45. A manifold pipe assembly as in claim 40, the cooling chamber having a depth D2 measured between an outer diameter of said manifold pipe and an inner diameter of said jacket pipe, the ratio of the depth of the cooling chamber to the outside diameter of the manifold pipe, at locations away from the inlet end of the cooling chamber, being about 0.1/1 to about 0.25/1.

46. A manifold pipe assembly as in claim 40 wherein said second inlet end of said jacket pipe is displaced from the first inlet end of the manifold pipe, at locus of closest approach of said jacket pipe to the first inlet end of said manifold pipe, by a distance of about 0.5 inch to about 3 inches.

47. A manifold pipe assembly as in claim 40, and including, as a relatively enlarged cross-section portion of said jacket pipe, an accumulation reservoir as part of said cooling chamber, proximate the second inlet end of said jacket pipe, said accumulation reservoir being effective to increase residence time of cooling liquid in the cooling chamber at the accumulation reservoir.

48. A manifold pipe assembly as in claim 47 wherein the ratio D1/D2 is about 1.2/1 to about 4/1.

49. A manifold pipe assembly as in claim 47 wherein the ratio D1/D2 is about 1.5/1 to about 3/1.

50. A manifold pipe assembly as in claim 40 wherein a distance between the inlet end of the manifold pipe, and the closed end chamber portion is no more than about 0.38 inch.

51. A manifold pipe as in claim 40 wherein, in routine hot gas transfer operation, the manifold pipe exhibits temperature-related color differentiation indications at an outer surface thereof between the first inlet end of said manifold pipe and the second inlet end of said jacket pipe.

52. A manifold pipe assembly as in claim 40 defined in combination with an internal combustion engine designed and configured to develop at least 350 horsepower.

53. A manifold pipe assembly as in claim 40 defined in combination with an internal combustion engine designed and configured to develop at least 1000 horsepower.

54. A manifold pipe assembly as in claim 40 defined in combination with an internal combustion engine designed and configured to develop at least 1500 horsepower.

55. A manifold pipe assembly as in claim 40 defined in combination with an internal combustion engine designed and configured to develop at least 2500 horsepower.

56. A manifold pipe assembly as in claim 40, the second inlet end of the jacket pipe approaching the manifold pipe at angles of about 70 degrees to about 110 degrees thereby to form a cooling chamber between the manifold pipe and the jacket pipe.

57. An exhaust manifold assembly for receiving hot gases from a heat source and for conveying such hot gases from the heat source toward a lower temperature environment, said exhaust manifold assembly comprising:
  (a) a manifold bracket for mounting to the heat source, said manifold bracket having a plurality of apertures extending therethrough;
  (b) a manifold pipe cluster comprising a plurality of jacketed manifold pipe assemblies, inlet ends of said manifold pipe assemblies being received in gas-tight securement into respective ones of the apertures in said manifold bracket; and
  (c) an exhaust pipe, receiving outlet ends of said manifold pipe assemblies in gas-tight securement at an inlet end of said exhaust pipe, said exhaust pipe receiving hot gases from said manifold pipe assemblies and directing the hot gases away from the heat source, each said jacketed manifold pipe assembly comprising
  (i) a manifold pipe having a first inlet end and a single inlet opening for receiving hot gases from the heat source at the inlet end, and a first outlet end and an outlet opening at the outlet end, and a length between the first inlet end and the first outlet end, said manifold pipe defining a closed conveyance path, between the first and second ends, for conveying hot gases from the single inlet opening to the outlet opening,
  (ii) a jacket pipe disposed outwardly of, and encompassing, the manifold pipe along a portion of the length of the manifold pipe, the jacket pipe having a second inlet end disposed toward the first inlet end of the manifold pipe, and a second outlet end disposed toward the first outlet end of the manifold pipe, the jacket pipe being closed about and secured to the manifold pipe at the second inlet end of the jacket pipe, thereby to form a cooling chamber having a closed inlet end, between the manifold pipe and the jacket pipe, the second inlet end of said jacket pipe being spaced from the first inlet end of said manifold pipe, such that a portion of the length of said manifold pipe adjacent the first inlet end thereof is not encompassed by said jacket pipe, and
  (iii) an inlet pipe providing liquid communication into the cooling chamber, a closed end chamber portion of the cooling chamber being defined between said inlet pipe and a face of the cooling chamber disposed toward the first end of the manifold pipe, said inlet pipe being sufficiently close to the inlet end of the cooling chamber in combination with the closed end chamber portion being suitably configured as to maintain sufficient flow of cooling liquid at the inlet end, into and through the closed end chamber portion, to preclude development of localized hot spots on the manifold pipe adjacent the cooling chamber when cooling water is routinely passing through the cooling chamber during routine operating conditions of said exhaust system.

58. An exhaust manifold assembly as in claim 57, said jacket pipe having an inside diameter at least 0.12 inch greater than the outside diameter of said manifold pipe.

59. An exhaust manifold assembly as in claim 57, said jacket pipe having an inside diameter at least 0.25 inch greater than the outside diameter of said manifold pipe.

60. An exhaust manifold assembly as in claim 57, the cooling chamber having a depth D2 measured between an outer diameter of said manifold pipe and an inner diameter of said jacket pipe, the ratio of the depth of the cooling chamber to the outside diameter of the manifold pipe, at locations away from the inlet end of the cooling chamber, being about 0.05/1 to about 0.3/1.

61. An exhaust manifold assembly as in claim 57, the cooling chamber having a depth D2 measured between an outer diameter of said manifold pipe and an inner diameter of said jacket pipe, the ratio of the depth of the cooling chamber to the outside diameter of the manifold pipe, at locations away from the inlet end of the cooling chamber, being about 0.1/1 to about 0.25/1.

62. An exhaust manifold assembly as in claim 57 wherein said second inlet end of said jacket pipe is displaced from the first inlet end of the manifold pipe, at locus of closest approach, by a distance of about 0.5 inch to about 3 inches.

63. An exhaust manifold assembly as in claim 62 wherein, in routine hot gas transfer operation, the manifold pipe exhibits temperature-related color differentiation indications at an outer surface thereof between the first end of said manifold pipe and the second inlet end of said jacket pipe.

64. An exhaust manifold assembly as in claim 57, and including, as a relatively enlarged cross-section portion of said jacket pipe, an accumulation reservoir as part of said cooling chamber proximate the second inlet end of said jacket pipe, said accumulation reservoir being effective to increase residence time of cooling liquid in the cooling chamber at the accumulation reservoir.

65. An exhaust manifold assembly as in claim 64 wherein the ratio D1/D2 is about 1.2/1 to about 4/1.

66. An exhaust manifold assembly as in claim 64 wherein the ratio D1/D2 is about 1.5/1 to about 3/1.

67. An exhaust manifold assembly as in claim 57 wherein a distance between the inlet end of the manifold pipe, and the closed end chamber portion is no more than about 0.38 inch.

68. An exhaust manifold assembly as in claim 57 defined in combination with an internal combustion engine designed and configured to develop at least 350 horsepower.

69. An exhaust manifold assembly as in claim 57 defined in combination with an internal combustion engine designed and configured to develop at least 1000 horsepower.

70. An exhaust manifold assembly as in claim 57 defined in combination with an internal combustion engine designed and configured to develop at least 1500 horsepower.

71. An exhaust manifold assembly as in claim 57 defined in combination with an internal combustion engine designed and configured to develop at least 2500 horsepower.

72. An exhaust manifold assembly as in claim 57, said second inlet end of said jacket pipe approaching said manifold pipe along an arcuate path defining an approach angle of about 70 degrees to about 110 degrees at a joinder of the jacket pipe to the manifold pipe, thereby enabling said jacket pipe to flex according to thermal stresses placed thereon while retaining acceptable levels of stress to the joint.

73. An exhaust manifold assembly as in claim 57, said inlet pipe being sufficiently close to the inlet end of the cooling chamber to maintain sufficient flow of cooling liquid at the inlet end into and through the closed end space, to preclude substantial vaporization of cooling water at the closed end space under routine operating conditions of the pipe assembly.

74. A manifold pipe assembly as in claim 57, the second inlet end of said jacket pipe being spaced from the first inlet end of said manifold pipe such that a portion of the length of said manifold pipe adjacent the first inlet end thereof is not encompassed by said jacket pipe.

* * * * *